United States Patent Office 3,391,822
Patented July 9, 1968

3,391,822
METHOD OF BONDING AN ETHYLENE-ALPHA OLEFINE COPOLYMER TO METAL
Roy John Harris, Knaresborough, and Reginald James German, Streetly, England, assignors to The Dunlop Company Limited, London, England
No Drawing. Filed July 8, 1964, Ser. No. 381,218
Claims priority, application Great Britain, July 12, 1963, 27,718/63
19 Claims. (Cl. 220—64)

ABSTRACT OF THE DISCLOSURE

Ethylene-alpha-olefin interpolymers are bonded to metal by applying to the metal surface a mixture of the vulcanized interpolymer with an organic peroxide which liberates a mineral acid when heated and then heating said mixture to a vulcanizing temperature while in contact with the metal surface. Preferred materials are ethylene-propylene copolymers and tetrachloro-di-t-butyl peroxide, carbon black, sulfur, and other compounding materials may also be incorporated in the mixture before application to the metal surface.

---

This invention relates to an improved method of bonding a rubber composition to metal surface.

According to the present invention, a method of bonding a metal surface to a rubber composition comprising an interpolymer of ethylene and an alpha-olefine with or without one or more copolymerizable compounds serving to confer unsaturation on the unvulcanized interpolymer, comprises mixing the interpolymer in the unvulcanized state with an organic peroxide which liberates a mineral acid when heated, applying the mixed composition to the metal surface to be bonded, and heating, the composition to a temperature in excess of the temperature required to cause said organic peroxide to liberate a mineral acid, to effect vulcanization of the interpolymer and bonding of the composition to the metal surface.

Preferably, sulphur is incorporated into the rubber composition to assist vulcanization of the interpolymer, and the amount of sulphur incorporated is usually from 0.3 percent to 0.5 percent by weight of the interpolymer.

The organic peroxide that is employed to effect the vulcanization of the interpolymer and to promote adhesion of the rubber composition to the metal surface, is of the type that liberates a mineral acid when heated, and such mineral acid can be hydrochloric acid. Typical peroxides that can be employed are those having the general formula $R_1(R_2)(R_3)COOC(R_4)(R_5)R_6$, in which each of the groups $R_1$, $R_2$, $R_3$, $R_4$, $R_5$ and $R_6$ represents an alkyl group and in which at least one hydrogen atom of at least one alkyl group is replaced by a chlorine atom or other halogen atom. Typical organic peroxides of this type are trichloro-ditertiary-butyl peroxide and tetrachloro-ditertiary-butyl peroxide. The amount of the organic peroxide employed is usually up to 10 percent of the weight of the interpolymer, but preferably is from 3 percent to 5 percent of the weight of the interpolymer.

The temperature at which the rubber composition is heated to effect vulcanization thereof must be above the temperature at which the organic peroxide liberates a mineral acid, and will usually be from 120° C. to 220° C., preferably from 150° C. to 180° C.

The intepolymer can be a copolymer of ethylene and any alpha-olefine, e.g. propylene which can contain varying amounts of ethylene, or can be an interpolymer prepared from ethylene and the alpha-olefine with one or more copolymerizable compounds which confer unsaturation on the unvulcanized interpolymer. When the interpolymer contains such a compound conferring unsaturation on it, then the interpolymer may contain from 0.5 to 5 mole percent of this compound. The compound employed to confer unsaturation on the copolymer should contain at least two olefinic double bonds and can be an open-chain or ring diolefinic compound or an acetylene or a bridged-ring hydrocarbon. Examples of suitable compounds are conjugated and unconjugated dienes such as butadiene, isoprene, piperylene, dimethylbutadinene, hexadienes, heptadienes and higher homologues. Typical interpolymers containing ethylene and propylene and a bridged-ring hydrocarbon are amongst those described in our patent specification No. 880,904, and examples of the bridged-ring hydrocarbons are substituted endocyclic hydrocarbons such as 1,4-endomethylene-hydrind-2,6-diene, tricyclopentadiene and tetracyclopentadiene.

The rubber compositions to be bonded to the metal surfaces can include filler materials such as carbon black and preferably contain, if carbon black is to be included, an acidic black such as easy processing channel black. The amount of carbon black included can vary over a wide range, for example from 20 percent to 150 percent by weight of the interpolymer.

The method of the invention can be used to bond a rubber composition based on an interpolymer of ethylene and an alpha-olefine with or without a further copolymerizable monomer, to a wide variety of metal surfaces and is particularly useful for the bonding of the composition to a surface formed of steel, such as a mild steel, without the interposition of an adhesive layer. The method is extremely simple to operate and can be used for the production of a wide variety of articles. The method can be used for bonding a lining to metal vessels which are to contain corrosive fluids. The method results in the rubber composition being strongly bonded to the surface of the metal and the bond, although losing some of its strength when subjected to high temperature, is far superior to those given by existing adhesives which have been used for this purpose. Further, in applications where the bond is required to withstand the attack of hydraulic fluid such as that used in aircraft control systems, then it has been found that articles manufactured by the method of the invention have a greater resistance to attack by the hydraulic fluid than when conventional adhesives are employed to bond the rubber composition to the metal component.

The invention is illustrated by the following examples in which all parts are by weight.

Example I

Two rubber compositions A and B were prepared according to the following formulae:

| | Part(s) | |
|---|---|---|
| | A | B |
| Ethylene/propylene copolymer (ML-4 at 100° C.=42) | 100 | 100 |
| HAF black | 50 | 50 |
| Sulphur | 0.4 | 0.4 |
| Dicumyl peroxide | 4 | |
| Tetrachloro-di-t-butyl peroxide | | 4 |

The ethylene/propylene copolymer contained approximately 44 mole percent of ethylene.

The two compositions were prepared by milling. Two pairs of mild steel discs having a diameter of 0.75 inch were abraded with No. 2 emery cloth to give a matt finish and degreased with trichloroethylene vapour. A sample of composition A was placed between a pair of discs and a sample of composition B between the other pair of discs. The laminates so obtained were heated in a press to vulcanize the rubber composition and bond it to the mild steel discs. The time and temperature of vulcanization and the bond strength of the vulcanized samples are shown below in Table I. The bond strength in tension was measured with a 10-ton Avery machine having a jaw separation rate of 1.75 to 2 inches per minute.

TABLE I

| Composition | Vulcanization | Average Bond Strength (p.s.i.) |
|---|---|---|
| A | 60 mins. at 150° C | 54 |
| B | 60 mins. at 170° C | *582 |

*Cohesional failure in rubber.

This example shows clearly the improved strength of the bond to the mild steel of composition B as compared with composition A which contains dicumyl peroxide which does not liberate a mineral acid on heating.

Example II

The experiments described in Example I were repeated to test four compositions A, B, C and D:

|  | A | B | C | D |
|---|---|---|---|---|
| Ethylene/propylene copolymer | 100 | 100 | 100 | 100 |
| HAF black | 50 | 50 | | |
| EPC black | | | 50 | 50 |
| Sulphur | 0.4 | 0.4 | 0.4 | 0.4 |
| Dicumyl peroxide | 4 | | 4 | |
| Tetrachloro-di-t-butyl peroxide | | 4 | | 4 |

The copolymer was similar to that used in Example I.

The samples were made up into testpieces as in Example I, vulcanized and the bond strength of the laminates determined. These are shown in Table II.

TABLE II

| Copolymer | Vulcanization | Average Bond Strength (psi) |
|---|---|---|
| A | 60 mins. at 170° C | 68 |
| B | 60 mins. at 170° C | *582 |
| C | 60 mins. at 170° C | 168 |
| D | 60 mins. at 170° C | *660 |

*Cohesional failure in rubber.

These results show that the use of an acid black improves the bond strength.

Example III

This example illustrates the behavior of a rubber composition when bonded to smooth and matt surfaces respectively.

Two compositions E and D were prepared according to the following formulae:

|  | D | E |
|---|---|---|
| Ethylene/propylene copolymer | 100 | 100 |
| HPC black | 100 | |
| EPC black | | 50 |
| Sulphur | 0.4 | 0.4 |
| Tetrachloro-di-t-butyl peroxide | 4 | 4 |

The copolymer was similar to that used in Example I.

Conical testpieces as described by Painter (Adhesives Age, 3, 2, 36 (1960)) were used in this and subsequent examples.

A sample of composition E was bonded to the matt surfaces of one pair of cones and a further sample was bonded to the smooth surfaces of another pair of cones. Composition D was similarly made up into two testpieces which were then vulcanized for 60 minutes at 170° C. and then average bond strengths were determined. The results are given in Table III.

TABLE III

| Composition | Surface of Cones | Average Bond Strength (lb./testpiece) |
|---|---|---|
| E | Smooth | 168 |
| E | Matt | 171 |
| D | Smooth | 109 |
| D | Matt | 111 |

Example IV

Testpieces prepared from compositions similar to E and D of Example III, but with 100 parts of black in each, were aged, after vulcanization, by heating in air at 200° C. for 4 hours. The results are shown in Table IVa.

TABLE IVa

| Composition | Average Bond Strength (lb./testpiece) | |
|---|---|---|
|  | Before Aging | After Aging |
| E | 168 | 97 |
| As E but containing 100 parts EPC black | 141 | 72 |

Testpieces using the compositions of Table IVa were immersed, after vulcanization, in a hydraulic fluid (Skydrol) based on a phosphate ester for 24 hours at 120° C. The average bond strength of the samples are shown in Table IVb:

TABLE IVb

| Composition | Average Bond Strength (lb./testpiece) | |
|---|---|---|
|  | Before Aging | After Aging |
| E | 168 | 95 |
| As E but with 100 parts EPC black | 141 | 68 |

Example V

Two compositions F and G were prepared according to the following formulae:

|  | Part(s) | |
|---|---|---|
|  | F | G |
| Ethylene/propylene copolymer (ML-4 at 100° C.= 35) | 100 | 100 |
| EPC black | 50 | |
| Sulphur | 0.4 | 0.4 |
| Tetrachloro-di-t-butyl peroxide | 4 | 4 |

The copolymer contained 50 mole percent ethylene.

The compositions were each formed into testpieces, using cones, and vulcanized for 60 minutes at 170° C. The average bond strength of aged and unaged testpieces was measured and the results are shown in Table V:

TABLE V

Compositions: Average bond strength (lb./testpiece)
F _____ 98
G _____ 197
After aging in air for 4 hours at 200° C.:
F _____ 40
G _____ 55

Having now described our invention, what we claim is:

1. A method of bonding a metal surface to a rubber composition comprising an interpolymer of ethylene and an alpha-olefine, comprises mixing the interpolymer in the unvulcanized state with from 0.5 to 10 percent by weight, based on the interpolymer, of an organic peroxide having the general formula $$R_1(R_2)(R_3)COOC(R_4)(R_5)R_6$$

in which each R group represents an alkyl group and in which at least one hydrogen atom of at least one alkyl group is replaced by a chlorine atom and which liberates hydrochloric acid when heated, applying the mixed composition to the metal surface to be bonded, and heating the composition to a temperature in excess of the temperature required to cause said organic peroxide to liberate hydrochloric acid, to effect vulcanization of the interpolymer and bonding of the composition to the metal surface.

2. A method according to claim 1 in which the amount of the organic peroxide employed is from 3 percent to 5 percent by weight based on the interpolymer.

3. A method according to claim 1 in which the organic peroxide is tetrachloro-ditertiary-butyl peroxide.

4. A method according to claim 1 in which the temperature at which the composition is heated is from 120° C. to 220° C.

5. A method according to claim 4 in which the temperature is from 150° C. to 180° C.

6. A method according to claim 1 in which sulphur is incorporated into the rubber composition.

7. A method according to claim 6 in which the amount of sulphur incorporated into the rubber composition is from 0.3 percent to 0.5 percent by weight based on the interpolymer.

8. A method according to claim 1 in which the alpha-olefine is propylene.

9. A method according to claim 1 in which the interpolymer contains from 0.5 to 5 mole percent of a copolymerizable diene to confer unsaturation on the unvulcanized interploymer.

10. A method according to claim 1 in which said copolymerizable diene is an open-chain diolefinic compound.

11. A method according to claim 1 in which said copolymerizable diene is a cyclic compound.

12. A method according to claim 1 in which the copolymerizable diene is an acetylene hydrocarbon.

13. A method according to claim 1 in which the copolymerizable diene is a bridged-ring hydrocarbon.

14. A method according to claim 1 in which the rubber composition contains a filler.

15. A method according to claim 14 in which the filler is carbon black.

16. A method according to claim 15 in which the carbon black is an acidic carbon black.

17. A method according to claim 15 in which the rubber composition contains from 20 percent to 150 percent by weight of carbon black based on the interpolymer.

18. A method according to claim 1 in which the metal is steel.

19. A container for corrosive fluids comprising a metal vessel having a lining of a rubber composition bonded thereto by the method of claim 1.

References Cited

UNITED STATES PATENTS

| | | | |
|---|---|---|---|
| 3,044,899 | 7/1962 | Canterino | 117—132 |
| 3,104,985 | 9/1963 | Williams et al. | 117—161 X |
| 3,112,211 | 11/1963 | Ward | 117—132 X |
| 3,208,982 | 9/1965 | Davis | 117—161 X |
| 3,262,482 | 7/1966 | Clifton et al. | 117—161 X |

FOREIGN PATENTS 1,215,944  11/1959  France.

OTHER REFERENCES

DiGiulio et al.: Kautschuk and Gummi, vol. 15, January 1962, pp. WT6–WT13.

RALPH S. KENDALL, *Primary Examiner.*